(12) United States Patent
Chen et al.

(10) Patent No.: US 9,506,555 B2
(45) Date of Patent: Nov. 29, 2016

(54) HOLLOW-TYPE PLANET SPEED REDUCER

(71) Applicants: PRECISION MACHINERY RESEARCH & DEVELOPMENT CENTER, Taichung (TW); DELTA ELECTRONICS, INC., Taoyuan County (TW)

(72) Inventors: Che Chien Chen, Taichung (TW); Jun Huang Lee, Taipei (TW); Han Pei Wang, Taichung (TW); Chin Hsiung Tsai, Tainan (TW); Chi Wen Chung, Tainan (TW)

(73) Assignees: Precision Machinery Research & Development Center, Taichung (TW); Delta Electronics, Inc., Taoyuan County (TW)

( * ) Notice: Subject to any disclaimer, the term of this patent is extended or adjusted under 35 U.S.C. 154(b) by 0 days.

(21) Appl. No.: 14/580,642

(22) Filed: Dec. 23, 2014

(65) Prior Publication Data

US 2016/0178049 A1 Jun. 23, 2016

(51) Int. Cl.
| | |
|---|---|
| *F16H 57/08* | (2006.01) |
| *F16H 1/28* | (2006.01) |
| *F16H 57/02* | (2012.01) |
| *F16H 37/08* | (2006.01) |
| *F16H 48/10* | (2012.01) |
| *F16H 1/46* | (2006.01) |

(52) U.S. Cl.
CPC ............... *F16H 57/08* (2013.01); *F16H 1/28* (2013.01); *F16H 1/46* (2013.01); *F16H 37/0826* (2013.01); *F16H 2048/106* (2013.01); *F16H 2057/02034* (2013.01)

(58) Field of Classification Search
None
See application file for complete search history.

(56) References Cited

U.S. PATENT DOCUMENTS

| | | | |
|---|---|---|---|
| 3,369,636 A * | 2/1968 | Nelson | F16D 43/286 192/48.601 |
| 3,390,585 A * | 7/1968 | Heinrich | B24B 31/02 74/410 |
| 3,757,912 A * | 9/1973 | Ball, Jr. | F16D 48/064 192/48.5 |
| 4,417,485 A | 11/1983 | Boor | |
| 5,459,925 A | 10/1995 | Akeel et al. | |
| 6,699,152 B2 * | 3/2004 | Tanaka | F16H 1/32 475/149 |
| 8,038,563 B2 * | 10/2011 | Katsuma | B23Q 16/025 475/183 |
| 2001/0052735 A1 * | 12/2001 | Sakamoto | F16M 11/18 310/75 R |
| 2008/0113838 A1 * | 5/2008 | Kovach | F16H 1/227 475/24 |
| 2009/0011887 A1 | 1/2009 | Komada et al. | |
| 2009/0233750 A1 | 9/2009 | Nakamura | |
| 2012/0074820 A1 * | 3/2012 | Takeuchi | H02K 7/116 310/75 R |
| 2015/0111691 A1 | 4/2015 | Xu et al. | |

FOREIGN PATENT DOCUMENTS

| | | |
|---|---|---|
| JP | 1991-017668 A | 1/1991 |
| JP | 2010-023655 A | 2/2010 |

* cited by examiner

*Primary Examiner* — Colby M Hansen
(74) *Attorney, Agent, or Firm* — Rosenberg, Klein & Lee

(57) ABSTRACT

A hollow-type planet speed reducer includes a body. The body includes at least one driving gear driven by a power input source. The driving gear is connected to a transmission gear, and the transmission gear is connected to a first gear. Based on this, the output rotation speed can be reduced by the incorporation of the driving gear, the transmission gear and the first gear. Besides, a tubular member passes though the body and has an accommodating space to receive wires of the hollow-type planet speed reducer.

6 Claims, 6 Drawing Sheets

HOLLOW-TYPE PLANET SPEED REDUCER

BACKGROUND OF THE INVENTION

1. Field of the Invention

The present invention relates to a speed reducer, and more particularly to a hollow-type planet speed reducer.

2. Description of the Prior Art

In industrial fields, different speed reducers are utilized to magnify output torsion force and improve output precision; particularly, the hollow-type planet speed reducer is one of the commonest speed reducer. With advantages of not only mature developments and stable product qualities, but also lower manufacturing cost and higher transmission efficiency as compared to harmonic speed reducers, the hollow-type planet speed reducers, therefore, are wildly applied to numerous industrial machineries.

For the precision machineries, reductions of weight and volume are required; however, wires for connecting motors, such as cables, gas pipes and the like, are necessary components for the machinery. Conventionally, the conventional speed reducer lacks of proper designs on the interior spaces thereof, so that the wires of the conventional speed reducer occupy spaces to increase the overall volume of the conventional speed reducer.

The present invention is, therefore, designed to obviate or at least mitigate the above mentioned disadvantages.

SUMMARY OF THE INVENTION

An object of the present invention is to provide a hollow-type planet speed reducer using the planet gears as the auxiliary components of the speed reducing mechanism so as to reduce the energy cost of the motor input.

Another object of the present invention is to provide a speed reducer with a hollowed receiving space formed therein so as to receive different kinds of wires. By optimizing the spatial configuration within the speed reducer, the overall volume of the speed reducer can be reduced.

To achieve the above and other objects, a hollow-type planet speed reducer is provided. The hollow-type planet speed reducer includes a body. The body includes at least one driving gear driven by a power input source. The driving gear is connected to a transmission gear, and the transmission gear is connected to a first gear. A tubular member passes though the body and has an accommodating space to receive wires.

Wherein, the body further includes a second gear and a sun gear disposed along an axial line. The second gear is a ring gear with teeth formed on an interior circumference thereof and secured with the body. The sun gear is connected to the first gear via a connecting member and assembled to an interior of the second gear. The second gear and the sun gear are coplanar and the second gear encircles the sun gear. At least two planet gears (that is, a plurality of planet gears) are connected to the sun gear and respectively connected to the second gear. Thereby, the planet gears are driven by the sun gear to move around the sun gear. The planet gears are respectively assembled in an output member so as to drive the output member to rotate along with the movements of the planet gears.

In an implementation aspect, the first gear is a ring gear with teeth formed on an interior circumference thereof.

In another implementation aspect, the first gear is a gear with teeth formed on an exterior circumference thereof.

Preferably, the number of the driving gear is plural, and the power input source includes a plurality of motors. The number of the motors corresponds to the number of the driving gears. Each motor is connected to one driving gear so as to drive the driving gear, respectively. Furthermore, the sun gear is connected to a plurality of planet gears.

Preferably, the connecting member has a connecting portion extending along the axial line, and the tubular member passes through the connecting portion.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
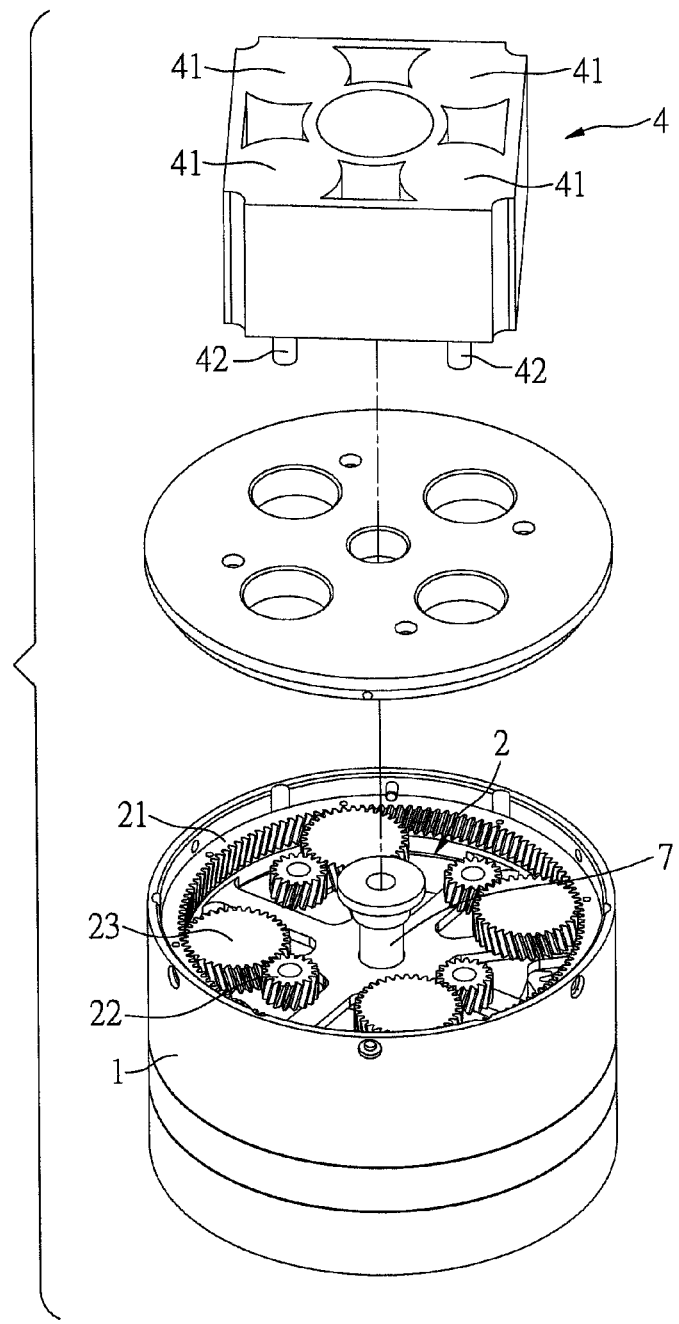
FIG. 1 is a partial exploded view (1) of a hollow-type planet speed reducer of the present invention.

Referring to FIGS. 1-6, a hollow-type planet speed reducer of the present invention is described as follows. The hollow-type planet speed reducer includes a body 1. A theoretical axial line 11 is defined to pass through the body 1. The body 1 includes a first gear 21, a second gear 31 and a sun gear 32 aligned coaxially along the axial line 11. The first gear 21 and the second gear 31 are respectively disposed at two sides of the body 1 so as to define a primary speed reducing mechanism 2 and a secondary speed reducing mechanism 3, respectively.

The second gear 31 is an inner gear. In detail, the second gear 31 is a ring structure and teeth are assembled in the inner surface (on the inner circumference) of the ring. Based on this, the second gear 31 is engaged with other gears with the inner surface thereof.

Figure 2:
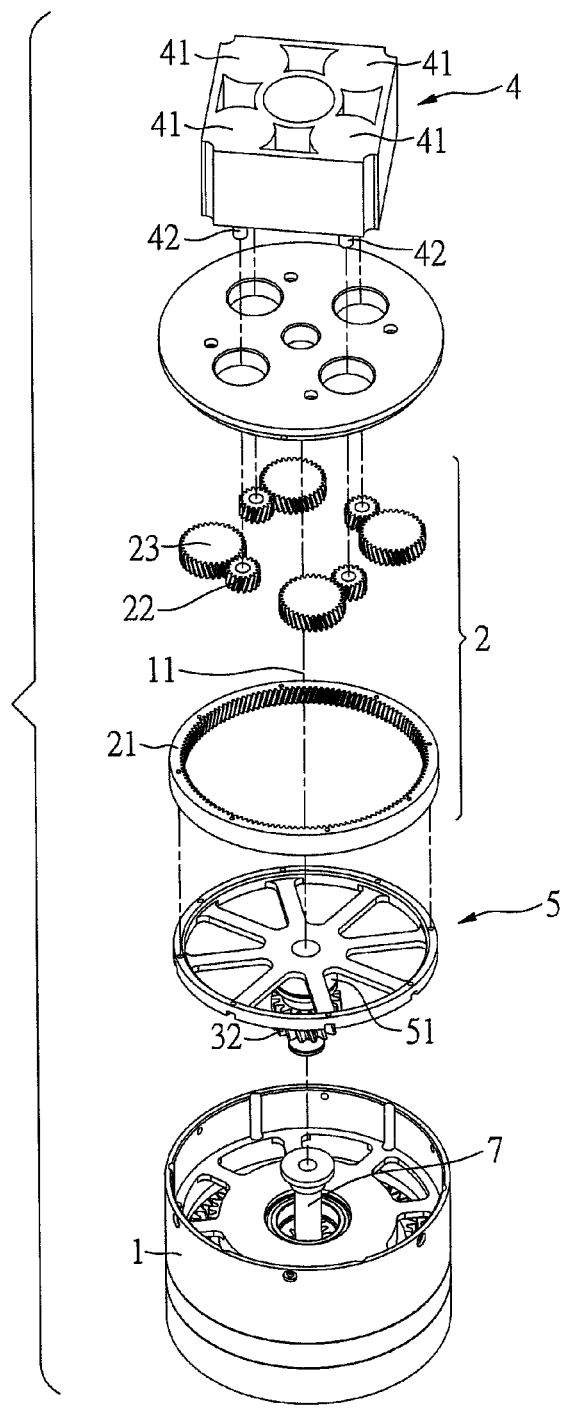
FIG. 2 is a partial exploded view (2) of the hollow-type planet speed reducer of the present invention.
Figure 6:
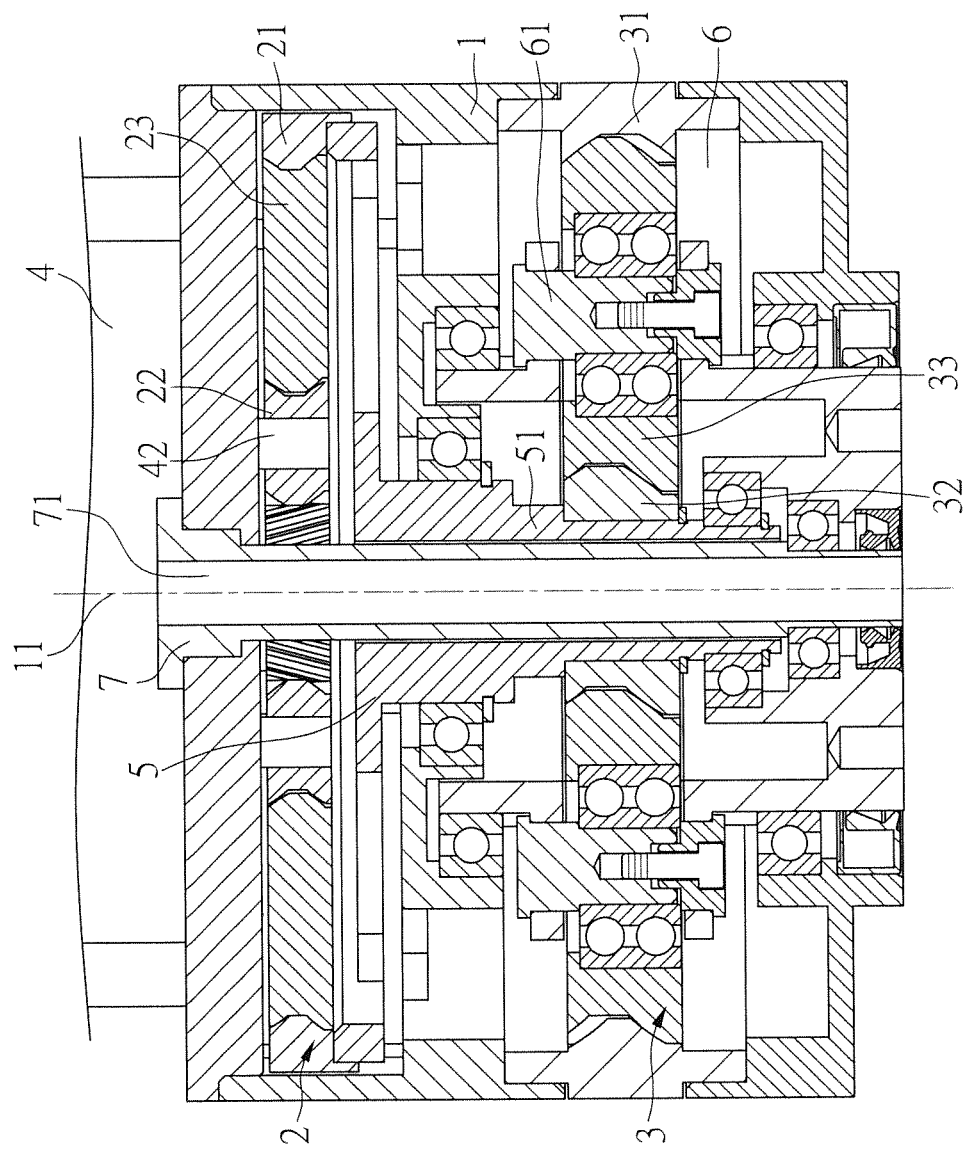
FIG. 6 is a cross-sectional view of the hollow-type planet speed reducer of the present invention.

As shown in FIG. 1, FIG. 2 and FIG. 6, in one embodiment the first gear 21 is an inner gear; that is, a ring gear with teeth formed on an interior circumference thereof. In the primary speed reducing mechanism 2, at least one driving gear 22 is located in the area encircled by the ring structure of the first gear 21, and the driving gear 22 is driven by a power input source 4. In this embodiment, the power input source 4 includes four motors 41; the four motors 41 are modulized as a module with four driving shafts 42 respectively extending therefrom; conversely, four driving gears 22 are located in the area encircled by the ring structure of the first gear 21 and disposed around the axial line 11 to respectively connect to the four driving shafts 42, thereby the driving gears 22 are rotated by the motors 41, respectively. Each of the driving gears 22 is connected to a transmission gear 23, and each of the transmission gears 23 is respectively connected to the first gear 21. The driving gears 22 have no direct connection with the first gear 21. The transmission gears 23 and the first gear 21 are respectively pivoted on the body 1. Based on this, when the motor 41 drives the driving gear 22 to rotate, the transmission gear 23 is rotated along with the rotation of the driving gear 22, and thus the first gear 21 is rotated along with the rotation of the transmission gear 23. In this embodiment, the driving gear 22 has less teeth than the number of teeth on the transmission gear 23, and the transmission gear 23 has less teeth than the number of teeth on the first gear 21; therefore, the rotation speed output by the motor 41 is reduced twice accordingly.

As above, in this embodiment, the primary speed reducing mechanism 2 utilizes four motors 41 to be driven simultaneously; as compared to conventional speed reducer which using one motor for driving, the rotational torques of the motors 41 of the hollow-type planet speed reducer according to the present invention can be reduced upon rotating thereby reducing the energy for activating and operating the motors 41. Furthermore, with the transmission gear 23 assembled between the driving gear 22 and the first gear 21 in which the number of the teeth of the transmission gear 23 is more than that of the driving gear 22 but less than that of the first gear 21, thus the driving gear 22 drives the transmission gear 23 with lower rotational torque. Therefore, comparing with the condition that the first gear 21 is directly driven by the driving gear 22, the energy cost for the condition that the driving gear 22 drives the transmission gear 23 to drive the first gear 21 to rotate is reduced.

Figure 3:
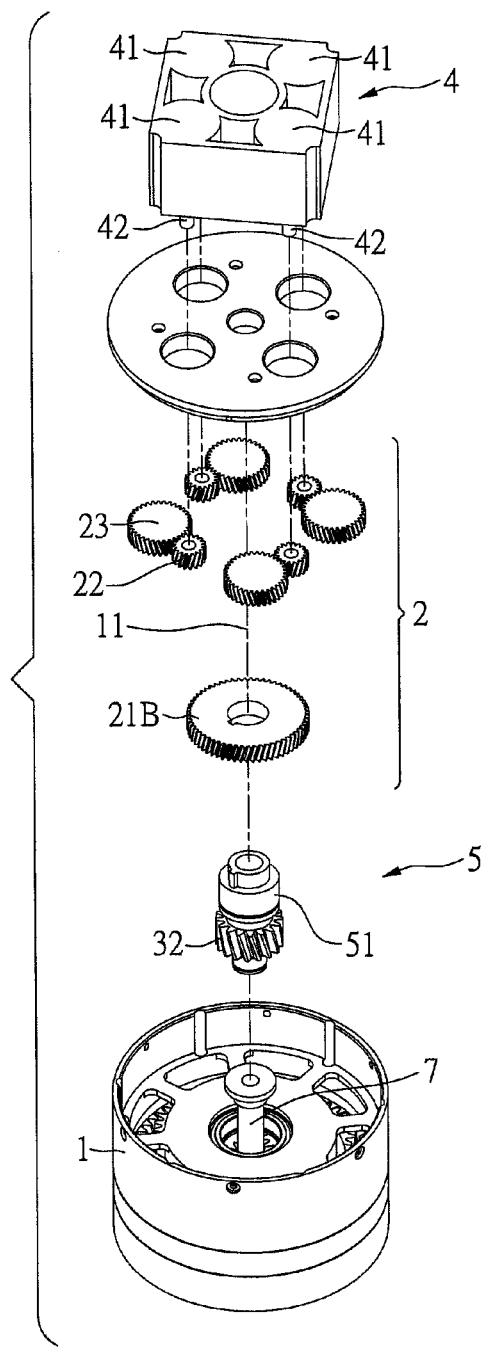
FIG. 3 is a partial exploded view (3) of the hollow-type planet speed reducer of the present invention.

In some implementation aspects, the first gear 21 is an outer gear; that is, a gear with teeth formed on an exterior circumference thereof, as shown by first gear 21B in FIG. 3. As shown, the first (outer) gear 21B has teeth disposed around the outer periphery thereof so as to engage with other gears, thereby accomplishing the same performance as the first speed reducing mechanism 2 does.

Figure 4:
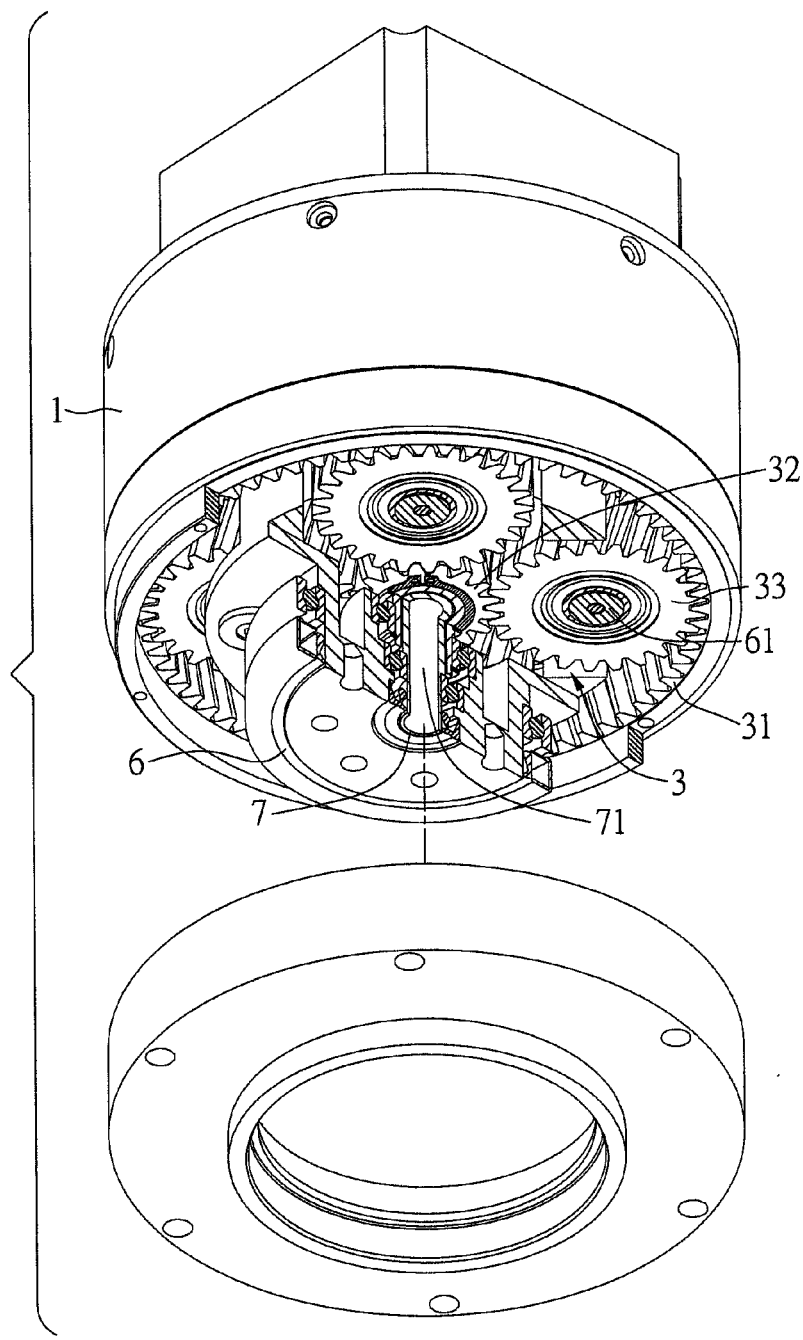
FIG. 4 is a partial exploded view (4) of the hollow-type planet speed reducer of the present invention.
Figure 5:
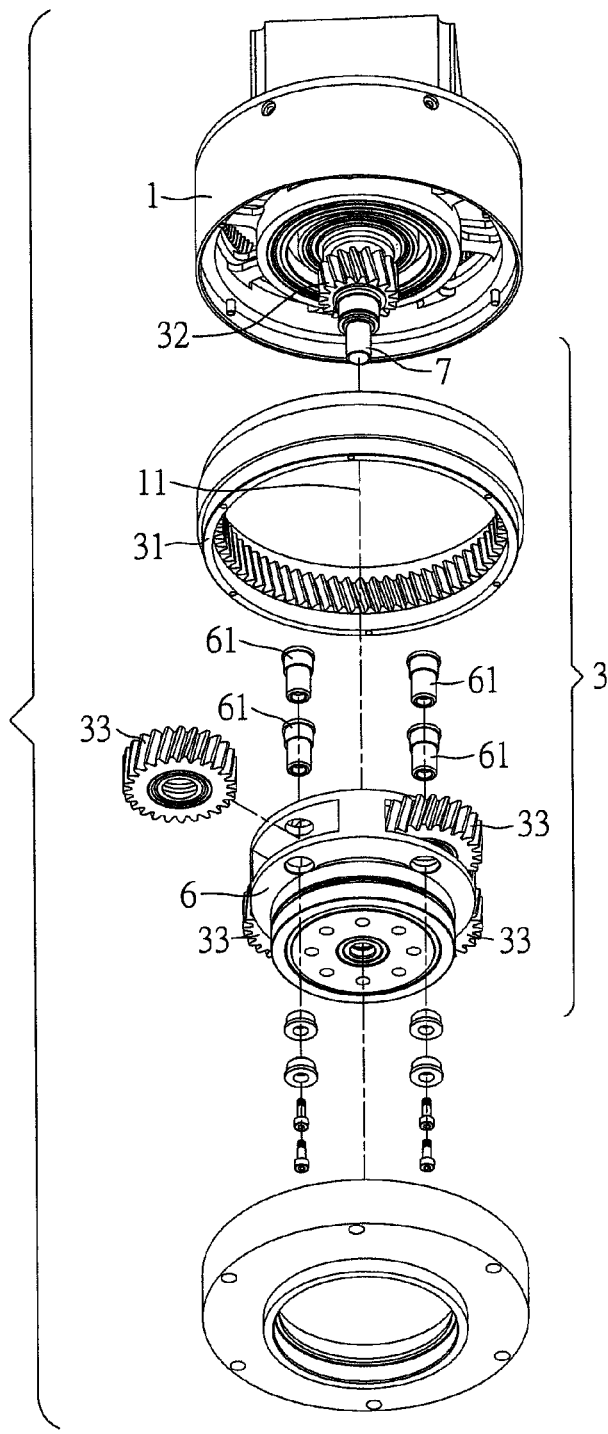
FIG. 5 is a partial exploded view (5) of the hollow-type planet speed reducer of the present invention.

Similarly, as shown in FIG. 4, FIG. 5 and FIG. 6; in the secondary speed reducing mechanism 3, the sun gear 32 is located in the area encircled by the ring structure of the second gear 31 and coplanar with the second gear 31; that is, the sun gear 32 and the second gear 31 are disposed in alignment with the same theoretical plane. Please refer to FIG. 2, in which the sun gear 32 is connected to the first gear 21 with a connecting member 5, thus the sun gear 32 and the first gear 21 are secured with each other to rotate simultaneously. In this embodiment, one end of the connecting member 5 includes a connecting portion 51 extending along the axial line 11, and one of two ends of the connecting portion 51 has a larger diameter than the other end of the connecting portion 51 so as to connect to the first gear 21. As shown in FIG. 4 and FIG. 5, the sun gear 32 is connected to at least two planet gears 33 (that is, a plurality of planet gears) but has no direct connection with the second gear 31. In this embodiment, the number of the planet gear 33 is four, and the planet gears 33 are disposed around the axial line 11. Each of the planet gears 33 is respectively connected to the second gear 31. The second gear 31 is secured with the body 1. The second gear 31 is stationary, thereby allowing the planet gear 33 being driven by the sun gear 32 to rotate around the sun gear 32. The planet gears 33 are assembled to and pivot on an output member 6; in detail, the axial center of each of the planet gear 33 is respectively passing through by a fastening member 61 to secure in the output member 6. Therefore, when the planet gears 33 rotate around the sun gear 32, the output member 6 is also rotated by the movements of the planet gears 33. Hence, the output member 6 is formed as an output end to drive an external device (not shown) connected thereto.

In the secondary speed reducing mechanism 3, as shown in FIG. 6, since the sun gear 32 is coaxially connected to the first gear 21, the rotation speed of the sun gear 32 equals to that of the first gear 21; that is, the sun gear 32 inherits the reduced rotation speed output by the primary speed reducing mechanism 2. And, with the planet gears 33, the rotation speed is further reduced; that is, the rotation speed of the planet gears 33 for moving around the sun gear 32 is less than the rotation speed of the sun gear 32. Briefly, the rotation speed output by the output member 6 is less than the rotation speed output by the motor 41 with the participation of the primary speed reducing mechanism 2 and the secondary speed reducing mechanism 3.

Furthermore, a tubular member 7 is disposed through the body 1 along and shares the axial line 11. The tubular member 7 passes through the first gear 21 and the second gear 31. The driving gears 22, the transmission gears 23 and the planet gears 33 are disposed around the tubular member 7. The tubular member 7 has an accommodating space 71 to receive wires, such as cable, gas pipes and the like. In this embodiment, the tubular member 7 is assembled in the connecting portion 51 of the connecting member 5, and the extending direction of the tubular member 7 is the same as the axial line 11. With the tubular member 7 for receiving wires, the configuration of the interior space of the hollow-type planet speed reducer can be optimized, so that the overall occupied volume of the hollow-type planet speed reducer can be reduced so as to minimize the size of the product.

Although particular embodiments of the invention have been described in detail for purposes of illustration, various modifications and enhancements may be made without departing from the spirit and scope of the invention. Accordingly, the invention is not to be limited except as by the appended claims.

The invention claimed is:

1. A hollow-type planet speed reducer comprising:
   a body;
   a tubular member passing through the body, the tubular member having a theoretical axial line passing therethrough and an accommodating space within to receive wires;
   at least one driving gear driven by a power input source and connected to a transmission gear, the transmission gear connected to a first gear, the at least one driving gear having no direct connection with the first gear, the at least one driving gear having less teeth than the transmission gear;
   a second gear disposed coaxial with the first gear within the body, the second gear having teeth formed on an interior circumference thereof;
   a sun gear fixedly secured to the first gear via a connecting member and coaxial with the first gear, the second gear encircling the sun gear, the tubular member passing through the sun gear; and
   a plurality of planet gears disposed around the tubular member and attached to pivot on a rotatable output member, each planet gear connected to the sun gear and the second gear, the sun gear having no direct connection with the second gear, the planet gears thereby driven by a cooperation between the second gear and the sun gear to move around the sun gear so as to rotate the output member,
   wherein the tubular member passes through the first gear, and the at least one driving gear and the transmission gear are disposed in the body and radially displaced from the axial line of the tubular member.

2. The hollow-type planet speed reducer as claimed in claim 1, wherein the plurality of planet gears is at least four planet gears.

3. The hollow-type planet speed reducer as claimed in claim 1, wherein one of two ends of the connecting member has a connecting portion extending along the axial line of the tubular member, and the tubular member passes through the connecting portion.

4. The hollow-type planet speed reducer as claimed in claim 1, wherein the first gear has teeth formed on an interior circumference thereof.

5. The hollow-type planet speed reducer as claimed in claim 1, wherein the first gear has teeth formed on an exterior circumference thereof.

6. The hollow-type planet speed reducer as claimed in claim 1, wherein:
- the at least one driving gear is a plurality of driving gears, and
- the power input source includes a plurality of motors equal in number to the driving gears, each motor connected to one driving gear so as to drive the driving gear.

* * * * *